United States Patent [19]
Hendry

[11] 3,879,155
[45] Apr. 22, 1975

[54] CLOSED CELL FOAM PLASTIC MOLDING APPARATUS

[75] Inventor: James W. Hendry, Louisville, Ky.

[73] Assignee: Hendry Engineering, Shelbyville, Ind.

[22] Filed: July 24, 1973

[21] Appl. No.: 382,205

Related U.S. Application Data

[62] Division of Ser. No. 233,213, March 9, 1972, Pat. No. 3,806,291.

[52] U.S. Cl................ 425/4 C; 425/203; 425/817 C
[51] Int. Cl................................................. B29f 3/06
[58] Field of Search........... 264/51, 53, 54, 68, 328, 264/329; 425/4 C, 817 C, 242, 244, 203, 245

[56] References Cited
UNITED STATES PATENTS

| | | | |
|---|---|---|---|
| 3,104,424 | 9/1963 | Immel............................. | 425/245 X |
| 3,538,203 | 11/1970 | Overcashier et al................ | 425/4 X |
| 3,633,494 | 1/1972 | Schippers et al. ............... | 425/203 X |
| 3,762,848 | 10/1973 | Muller.......................... | 425/242 R X |

Primary Examiner—Francis S. Husar
Assistant Examiner—Mark Rosenbaum
Attorney, Agent, or Firm—Woodhams, Blanchard and Flynn

[57] ABSTRACT

Plastic molding machine, primarily adapted for generating and molding a closed-cell foam plastic material. The foam is generated by introducing a gas inert to the plastic material into a granular mixture of same so that the gas is thoroughly intermixed among the granular particles. The gas is then held under pressure while the granular particles are reduced to a flowable material, said pressure being sufficient to assure that the gas will not be expelled therefrom during the plasticization process. In one preferred embodiment, gas is mixed into the granular plastic in a hopper and held therein under pressure as said granular material is fed into a screw and plasticized thereby.

The plastic material is then conducted at a relatively low pressure, such as that generated by the extrusion machine used for plasticizing the material, through a branched system past a check valve in each branch of said system, to an injection assembly. As each injection assembly receives a predetermined amount of plastic material, means are energized preventing more plastic material from entering thereinto but continued operation of the pressure generating device will continue filling other injection assemblies for as long as any thereof are capable of receiving such material. When all injection assemblies are filled, same are actuated simultaneously to drive the plastic material therefrom into the mold cavity. Injection assemblies may supply mold cavities in any pattern, and a single mold cavity may be associated with a given injection assembly or two or more injection assemblies may supply any one given mold cavity.

Local zones, preferably subjected to rapid cooling, are provided with undercut notches connected to the sprue, runners or cavity and filled thereby with plastic. Same is cooled ahead of the cooling of the molded part and provides means for holding the mold closed. This permits removal of the mold from the machine prior to cooling of the molded part and opening of the mold which in turn permits more effective use of multiple molds with a given machine.

8 Claims, 8 Drawing Figures

CLOSED CELL FOAM PLASTIC MOLDING APPARATUS

This is a division, of application Ser. No. 233,213 now U.S. Pat. No. 3,806,291, filed Mar. 9, 1972.

FIELD OF THE INVENTION

The invention relates to a plastic type method and apparatus and it relates particularly to a type thereof particularly adapted for generating a closed cell plastic foam and for molding same. Said molding is particularly intended for, but not confined to, the molding of very large products having dimensions of the order of several feet in at least two dimensional directions.

BACKGROUND OF THE INVENTION

While the generation of plastic foam and the molding thereof has been carried out through a variety of techniques and a variety of types of apparatus for a number of years, certain limitations have existed in previous known methods and apparatus which have prevented this type of material from attaining its full potential scope of use. There is a wide range of variables which are applicable to greater or lesser degrees according to the particular job to be molded and certain ones are discussed below to illustrate at least some of the difficulties which have been encountered in the prior practice.

For example, in the previous practice, it has been common to place a gas generating medium in the plastic material itself which medium will then produce gas when heated to a predetermined level. The mixture of the plastic material and such gas generating material is then heated, usually by a combination of agitating and of external heating sources, but conceivably by either acting alone. The foam material is formed thereby and is formed within the plastic heating apparatus. Said material is then held under sufficient pressure to minimize the expansion of the gas and the foam, still under such pressure, is then conducted to the mold, either directly or after preliminary gathering in an accumulator. This procedure is undesirable in that at first the gas generating material is often expensive, second it may or may not be uniformly mixed throughout the granular plastic material, and often does not generate gas bubbles uniformly within the plastic material, and third, since the gas generating material is responsive at least to some degree to temperature in controlling the amount of gas generated, and since the heating applied within the plasticizing device does not occur uniformly, the distribution of gas so generated throughout the plastic material is not uniform and hence further resulting in a foamed plastic product which is not of uniform or reliable quality.

Further, in the distribution of such plastic material from the foam generator to the mold cavity, present methods are reasonably satisfactory so long as only a single cavity mold is involved. However, where multiple cavities are involved or the cavities are separated from each other by substantial distances, then the pressure drop within the plastic material as same flows through the distribution system from one of the entrances of the mold cavity to the entrance of the next mold cavity, is often so great that the degree of filling of each mold cavity, or at least the density of material filled thereinto, is variable and it is extremely difficult to produce satisfactory products. This is particularly difficult where the plastic to be handled is a material of high viscosity, such as ABS materials.

Accordingly, the objects of the invention include:

1. To provide a method and apparatus for foaming a plastic material which will not be heat-dependent and will produce a foam of highly uniform density and with uniform and evenly distributed internal openings.

2. To provide a method and apparatus, as aforesaid, in which the gaseous material is introduced into and evenly distributed throughout the plastic material while in a granular state and before the plasticizing thereof.

3. To provide a method and apparatus wherein the gaseous material is distributed uniformly throughout the granular plastic material so that it is then heated to effect plasticization thereof while the gaseous material is held under sufficient pressure as to maintain itself uniformly distributed throughout the plastic material and thereby effect the formation of a desirable foam.

4. To provide a method and apparatus for producing a foamed material of uniform and accurately controllable density.

5. To provide apparatus for carrying out the foregoing claimed procedures accurately and reliably, which apparatus is of sufficient simplicity as not to be unreasonably expensive in the manufacturing procedure nor unreasonably complex to maintain in satisfactory working condition.

6. To provide apparatus as aforesaid wherein any kind of plastic material may be mixed with any desired type of gas which is chemically inert and otherwise compatible therewith.

7. To provide apparatus as aforesaid wherein the distribution of the foamed plastic material is carried out at a relatively low pressure whereby to minimize the pressure losses occurring during such distribution operation.

8. To provide apparatus as aforesaid in which the plastic material so distributed may be received in a plurality of suitable injection assemblies and wherein completion of the filling of one thereof will not adversely affect the filling of others thereof.

9. To provide apparatus as aforesaid wherein the quantity to be introduced into each injection assembly is independently adjustable and a change in the adjustment of one injection assembly will not affect the amount of plastic material introduced into another injection assembly.

10. To provide apparatus as aforesaid in which the longer portion of the distribution system between the foam generating device and the mold cavity is traversed by the plastic material at a relatively low pressure.

11. To provide apparatus as aforesaid in which the portion of the distribution system traversed by the plastic material under a relatively high injection, mold filling, pressure is relatively short and of equal length.

12. To provide apparatus as aforesaid in which the molds are arranged in cooperation with the plastic being molded therein to provide sufficient force opposing separation of the mold halves to permit removal of a mold from the molding machine prior to such cooling of the part as to permit opening of the mold.

Other objects and purposes of the invention will be apparent to persons acquainted with apparatus of this general type upon reading the following disclosures and inspecting the following drawings.

DETAILED DESCRIPTION

Inasmuch as the process concepts of the invention will be best understood when described in connection with specific apparatus by which same may be carried out, the description will proceed directly to a specific embodiment of the apparatus aspects of the invention. It will be readily recognized however, that, in spite of the advantages attributable to the apparatus of the invention which will become apparent as the description progresses, the process steps are capable of being practiced by a variety of other specific pieces of equipment. Hence, while the equipment herein illustrated and described will be utilized to illustrate the process of the invention, same is not limited thereto but may be practiced by other types of equipment.

Figure 1:
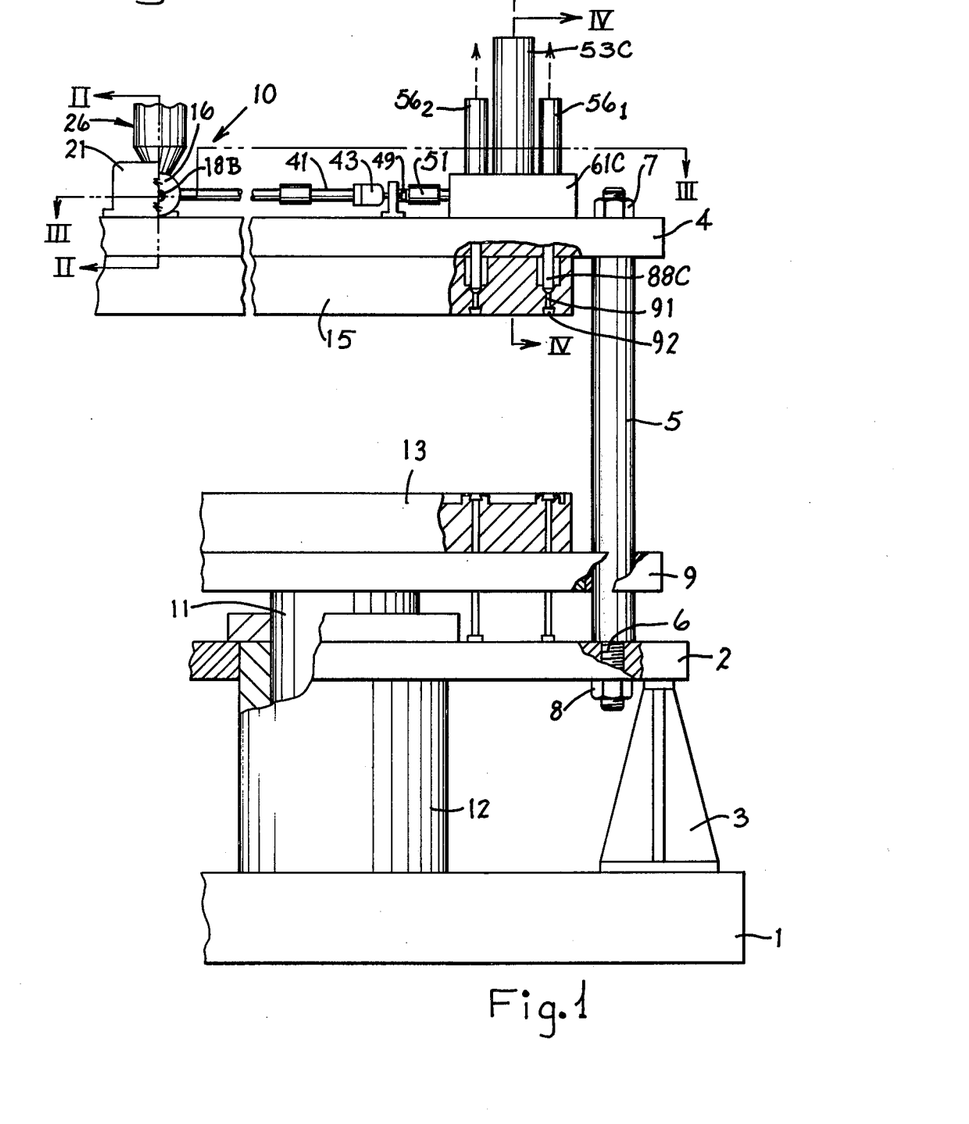
FIG. 1 is a somewhat schematic, partial side view, partially broken away, of a molding machine capable of performing the process concepts of invention and embodying the apparatus concepts of the invention.

Turning now to the drawings and with reference first to FIG. 1, there is shown a base 1 supporting a bottom frame plate 2 by suitable standards of which one appears at 3. Said bottom plate 2 supports a stationary platen 4 by a series of rods of which one appears at 5, said rods being affixed to the upper and lower frame plates 4 and 3 respectively in a conventional manner such as by having elongated threaded portions 6 of reduced diameter which extend through said plates and are affixed by any convenient means such as nuts 7 and 8. A movable platen 9 is supported by the plunger 11 of a clamp cylinder 12 and is caused by said cylinder to move vertically as desired in a conventional manner. The stationary platen 4 supports the upper, here the fixed, mold half 15. The lower mold half 13 is supported on the movable platen 9 to move upwardly toward and downwardly away from the stationary platen 4 in a manner already well known. The clamp cylinder 12 can act in any conventional manner in response to a suitable pressure fluid, usually hydraulic fluid, to effect the upward and downward movement.

Thus far, the molding machine as described is conventional and further detailing thereof is unnecessary.

Figures 2, 5:
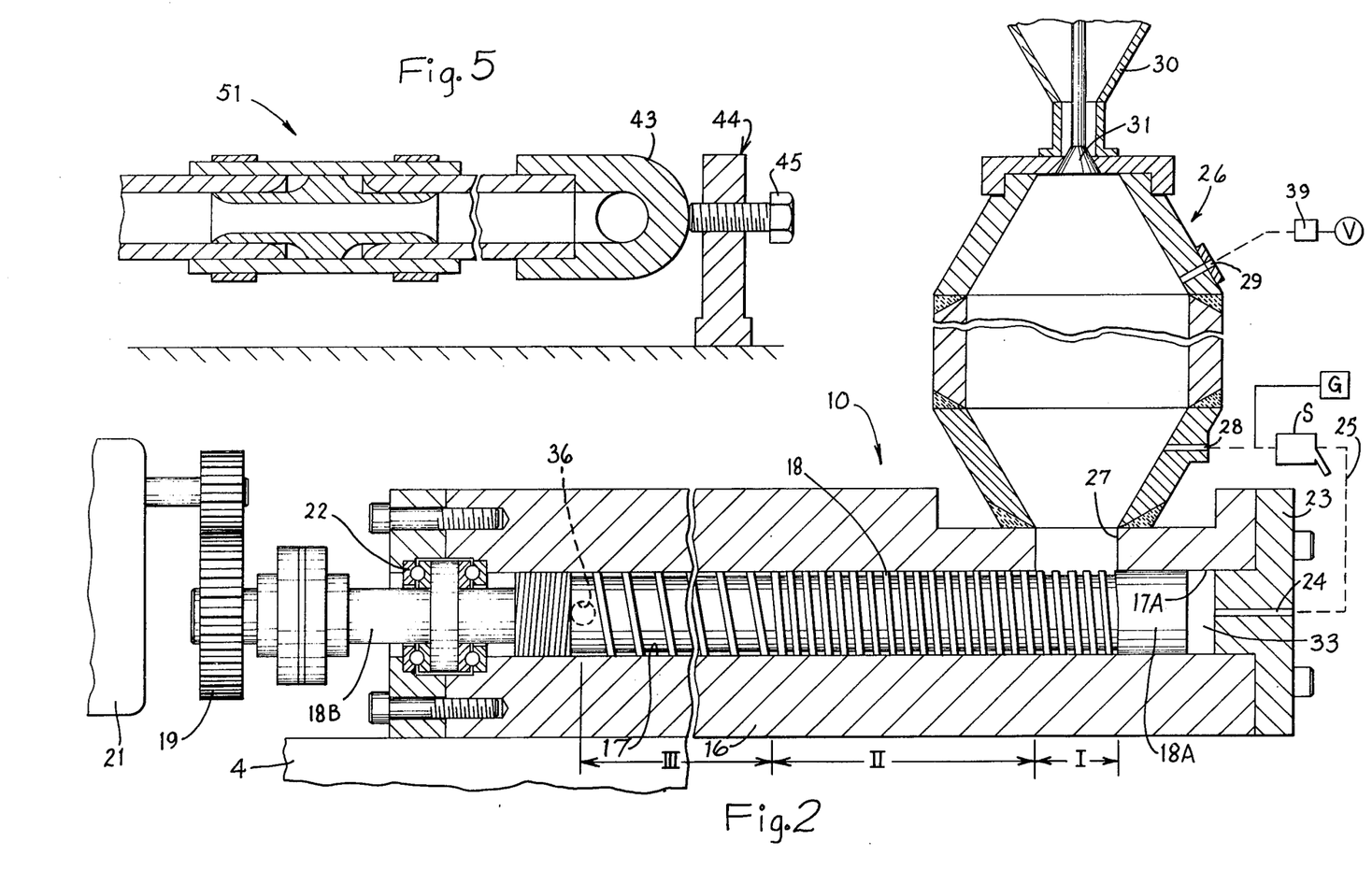
FIG. 2 is a section taken on the line II—II of FIG. 1.
FIG. 5 is a detail of the portion within the broken line box V of FIG. 3.

Turning now to the aspects of the apparatus embodying the invention, attention is next directed to FIG. 2 for the means 10 by which the foam is generated and placed under a low but adequate pressure for effective distribution of same. Referring to FIG. 2 there is shown a generally cylindrical barrel 16 having an internal cylindrical opening 17 extending therethrough. Said opening 17 is occupied by a plasticizing and extrusion screw 18 which will be described in more detail hereinafter. One end of said screw, here the end adjacent the discharge portion thereof is provided with a drive gear 19 which is then driven in any convenient manner, such as by hydraulic motor 21, which in turn is driven by any convenient source of hydraulic pressure fluid, all of which is already well known and needs no detailing. The same end of said screw is preferably received into and retained by a suitable thrust bearing 22 which bearing may be of any conventional nature and needs no further detailing. In this case however, it will be noted that the thrust bearing is of double construction so as to prevent axial movement of the screw in both axial directions.

The other end of said opening 17 is preferably closed by a cap 23 through which extends an opening 24, said opening 24 being connected by a conduit 25 to a hopper 26 for purposes which will appear in more detail hereinafter.

The hopper 26 is provided in communication with an opening 27 in the side of the barrel 16. An opening 28 is provided for introducing gas under pressure into the interior of the hopper 26 and the same opening or an additional opening, 29 may be provided for evacuating the hopper 26. An upper hopper 30 may, if desired, be provided for reception therewithin of granular plastic material. Said upper hopper may be opened and closed at its lower end by a valve member 31 operated in any conventional, convenient manner, such as by a pressure cylinder 32 shown in FIG. 8.

Referring now to the screw 18 (FIG. 2), the zone I thereof is provided with any conveying flights by which granular plastic material from within the hopper 26 is conveyed into the subsequently following portions of the screw. The zone II is provided with flights of proper shape and appropriate root diameter to effect some compression of the plastic material and heat generation therewithin. This at least commences the melting of the plastic granules. The zone III is provided with any desired flights and root diameter configuration to subject the plastic material to the necessary compression as to complete the heating thereof and holding as hereinafter further described the gas bubbles entrained therein.

A pair of opposite directed discharge openings 36 and 37 extend from either side of the screw chamber 17 near the discharge end thereof and are preferably spaced diametrically from each other.

All aspects of the screw as above-mentioned are well known in screw design and may be readily provided in many forms, according to the particular plastic being handled, by those skilled in the art to meet the several criteria referred to above. Accordingly, it is believed that the screw is sufficiently described at this point and no additional detailing thereof is needed.

Figure 8:
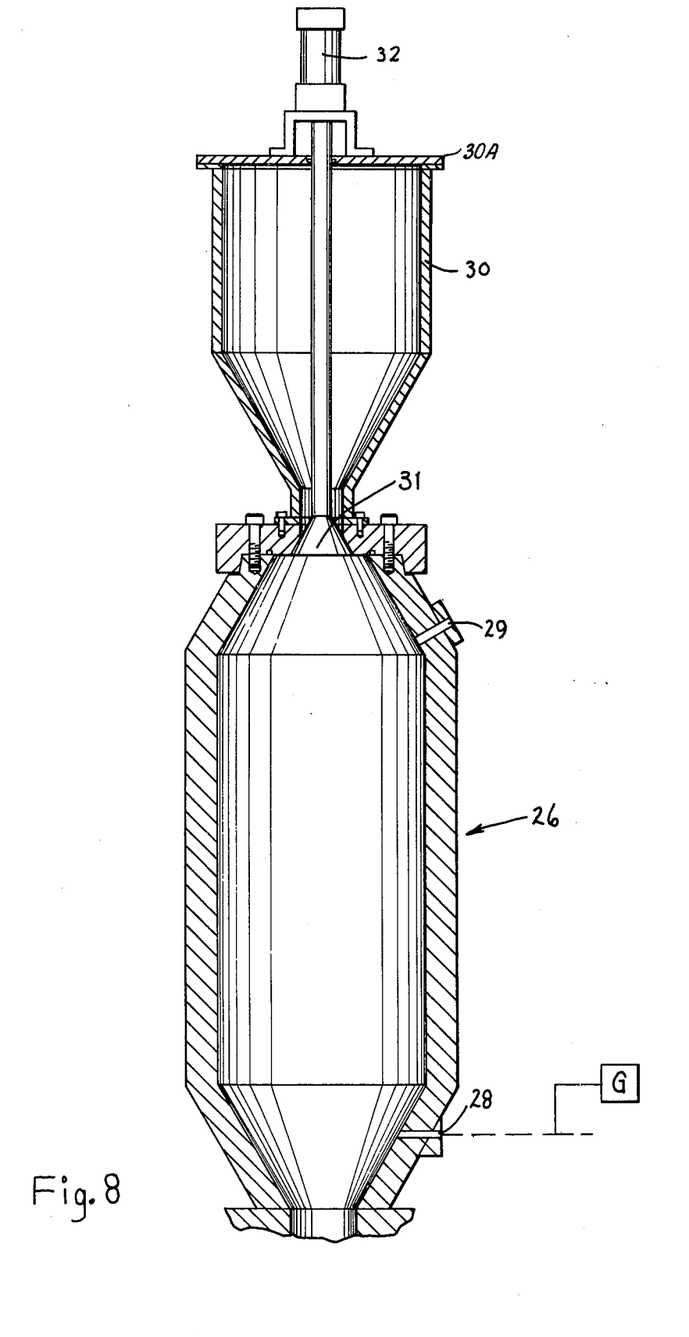
FIG. 8 is a central sectional view of one preferred form of hopper, said section being the same as that in FIG. 2.

In operating this portion of the invention and creation of a foam thereby a quantity of granular, plastic material will be supplied to the upper hopper 30, either through a suitable opening (not shown) through the cover 30A thereof or by temporary removal of said cover. The cylinder 32 is actuated to open the valve 31 and a measured quantity of plastic material, if desired the full capacity of the upper hopper 30, is permitted to enter into the lower hopper. The valve 31 is then closed and the upper hopper may then be refilled.

Assuming the plastic material to be reactive with oxygen but inert to nitrogen, vacuum from the vacuum source V will now be applied to the opening 29 so as to draw out most of the air within the hopper 26. When same is completed said opening will be closed by a valve 39.

A suitable gas, such as nitrogen, under pressure is now introduced from the source G through the opening 28 into the interior of the hopper 26. Inasmuch as the plastic granules have many spaces therebetween the gas will penetrate through said spaces and thus permeate the entire granular mass. With such gas being under a higher pressure than the back pressure generated within the screw, the granules as they drop down onto and into the portion of the section I of the screw continue to be surrounded by gas and said gas moves with such granules as same move into section II of the screw. Further with the pressure so maintained within the hopper 26, as the granules commence to melt in the section II of the screw the gas continues to permeate the plastic mass. Finally, when the granules complete their plasticization, regardless of whether it occurs in zone II or zone III of the screw, the gas is still distributed therethrough in small pockets and so distributed in the same manner as it was back in the hopper 26, namely, substantially uniformly throughout the entire plastic mass. While the precise magnitudes of pressure will be variable according to the requirements in an individual case, a typical illustration will be that the screw within the zone II thereof will develop a pressure on the plastic material of approximately 3,000 p.s.i. Thus to insure that the gas entrained in the plastic material is not squeezed out therefrom and back to the hopper 26, the gas within the hopper 26 will be maintained at a higher pressure, such as 5,000 p.s.i. This will insure that the gas will remain fully entrained within the plastic material throughout the plasticization process and will continue as it starts, namely, distributed uniformly in small separate pockets therethrough.

The granular material within the hopper 26 is in this embodiment assumed to fall by gravity through the opening 27 onto and into the screw 18 but it will be evident that any further conventional means may be supplied if desired for positively urging said granular material against and into said screw.

Thus, the plastic material appearing in the discharge openings 36 and 37 will be of foam nature, namely, a foam having independent substantially noncommunicating cells of substantially uniform size and distribution throughout. Further, the foam will be of a density having a high level of uniformity and will flow into the discharge openings 36 and 37 and thence into the distribution system supplied thereby in response to the discharge pressure of the extrusion screw, primarily the pressure generated and imposed on the plastic material by section III of said screw.

When a charge of granular plastic material contained in the hopper 26 is fully delivered to the extrusion screw it will, with the apparatus here shown, be desirable to withdraw the plasticizing gas to the maximum extent feasible, either through its own supply passageway 28 or through the vacuum passageway 29. When plasticizing gas pressure is thus reduced to a low level, the valve 31 may be withdrawn, a new charge of plastic placed in the lower hopper 26, the valve 31 again closed, and the cycle repeated.

It will be recognized of course that in a commercial unit the upper hopper and valve 31, utilized here solely for purposes of simplicity in illustration, may be replaced by any of many presently known automatic devices for introducing granular (including powdered) material either continuously or intermittently as desired into the hopper 26 which will then preferably be continuously pressurized by the inert gas.

The connection indicated at 25 between the thrust chamber 33 at the rightward (as seen in FIG. 2) end of the plasticizing screw 18 and the opening 28 for the hopper provides for the application of the same high-pressure gas toward the rightward end of said screw at the same time and during all of the time that such high-pressure gas is present within the hopper. The thrust chamber 33 is defined by the portion 17a of the plasticizing chamber and the portion 18a of the plasticizing screw, both of which project beyond the opening 27 in a direction opposite to the direction in which the granular material moves during a plasticizing operation. The connection 25 ensures against escape of said high-pressure gas toward the rearward (rightward) end of the plasticizing screw and, in addition, assists the thrust bearing 22 by providing a leftwardly directed pressure onto the screw opposing the rightwardly directed pressure developed thereon during a plasticizing operation. Thus, this conduit eliminates both the necessity for a thrust bearing at the rearward end of the screw and for the provision of a high-pressure gas seal. The separator S of any conventional nature may be provided if desired in the line 25 to separate from said gas any solid particles of plastic which may be carried thereinto from either the chamber 17 or from the interior of the hopper.

Figure 3:
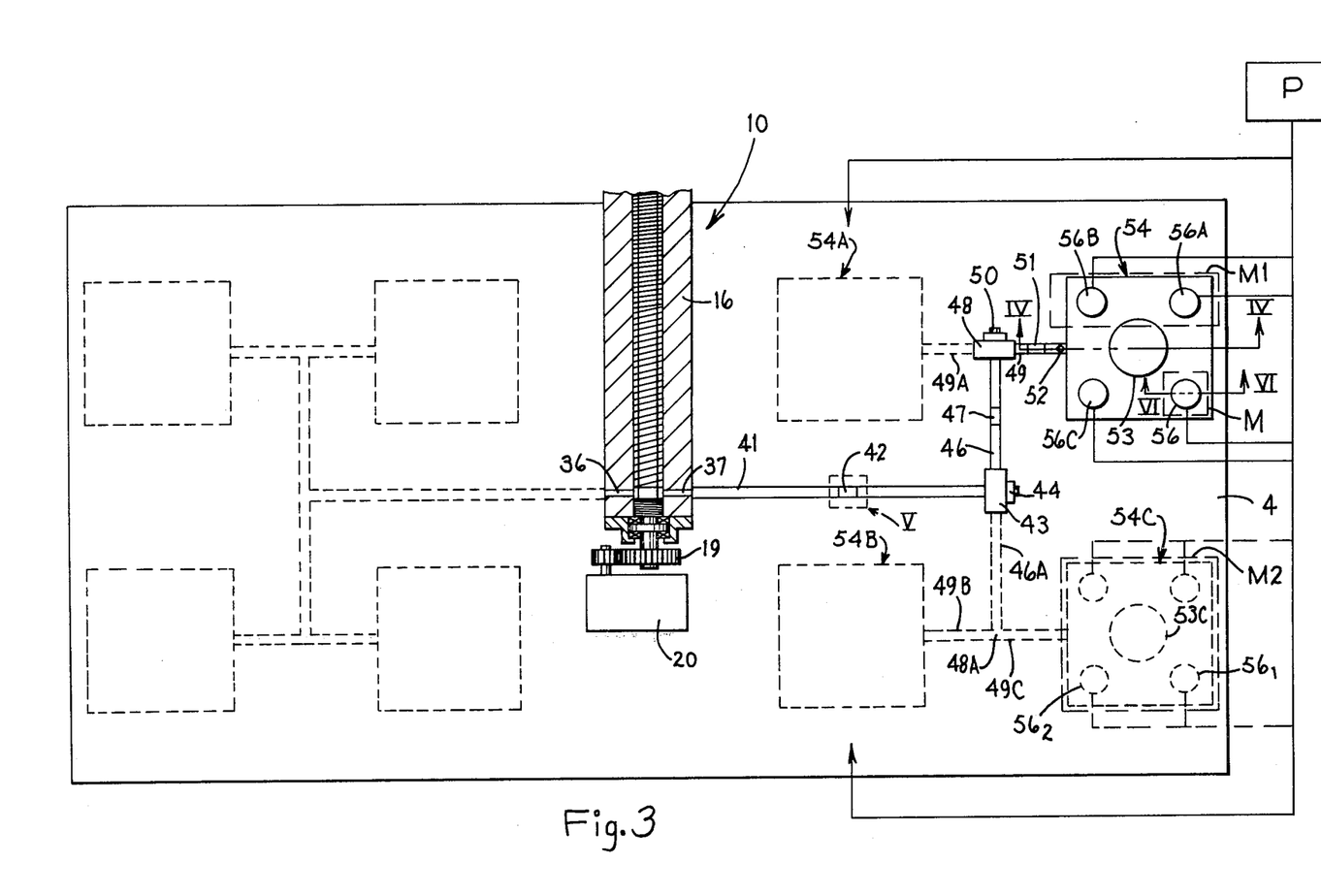
FIG. 3 is a section take on the line III—III of FIG. 1.

Turning now to the distributing and molding portion of the machine, attention is first directed to FIG. 3. A passageway 41 is provided on the platen 4 communicating with the exit 37 from the extruder 10, thence through an expansion joint 42 to a T-block 43 which is backed against a pressure block 44. A conduit 46 then extends from the T-block 43 through a further expansion joint 47 to another T-block 48. A conduit 49 then extends from the T-block 48 through the expansion joint 51 (FIGS. 3 and 4) to and through the check valve 52 into the injection unit 53.

The injection unit 53 is the central portion of what may be termed an injection assembly generally identified by the numeral 54. Said injection assembly comprises the injection unit itself and a plurality of valves therefor, of which one is indicated at 56, through which plastic material from the injection assembly 53 is conducted to a mold cavity.

Referring now to injection assembly 53 in more detail, it is essentially a small injection molding unit which may be of any of many known types but will here be illustrated and described sufficiently to insure correct understanding of the invention.

Figures 4, 6:
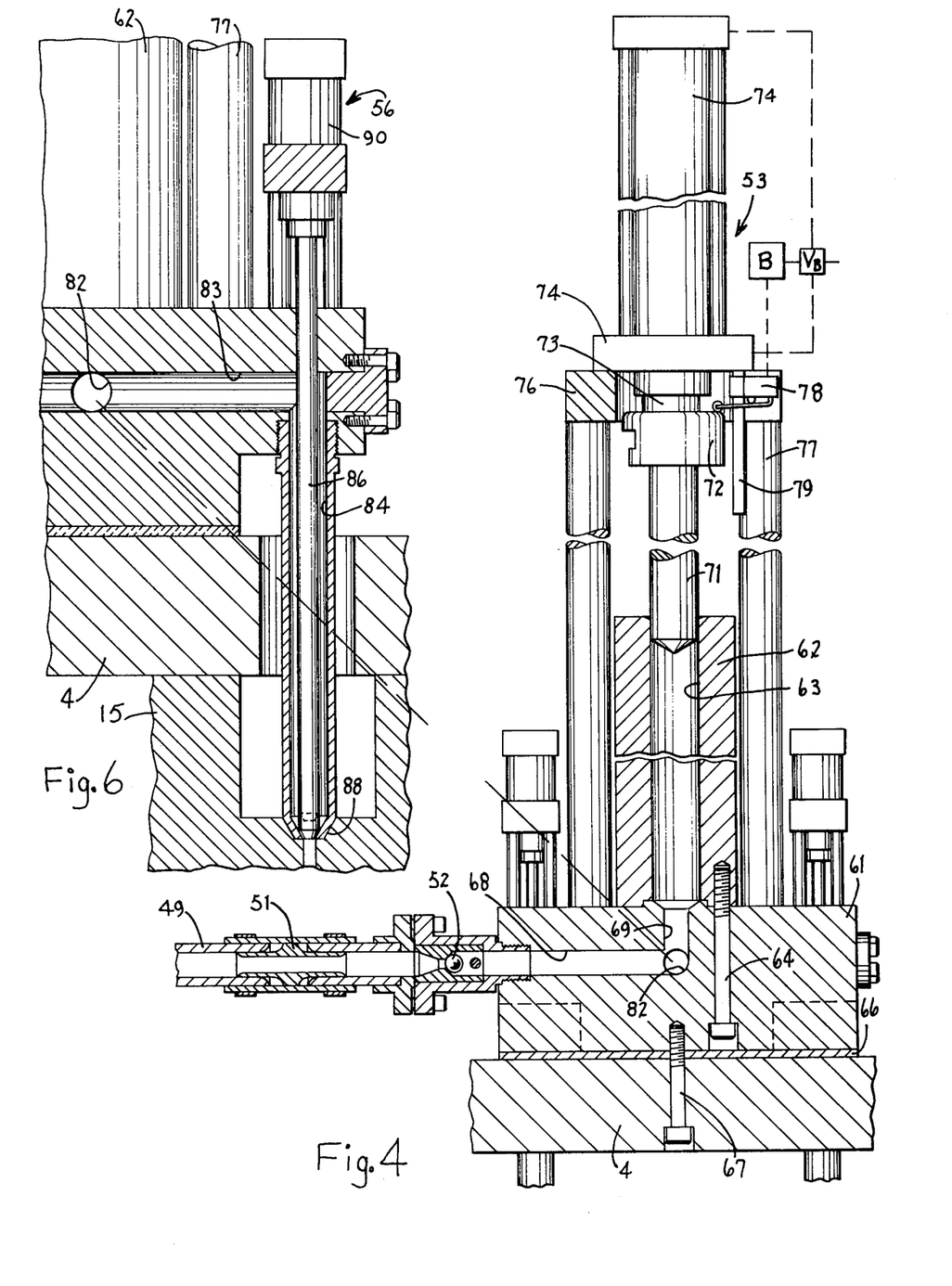
FIG. 4 is a section taken on either of the lines IV—IV of FIG. 1 or IV—IV of FIG. 3.
FIG. 6 is a section taken on the line VI—VI of FIG. 3.

Referring to FIG. 4 there is provided a base 61 supporting a block 62 within which is provided an injection chamber 63. The injection block 62 may be fastened to the base block 61 by any of several convenient means such as screws of which one is shown at 64. The base 61 is affixed rigidly with a layer of insulation 66 interposed therebetween onto the stationary platen 4 by any convenient means, such as screws of which one is shown at 67. The conduit 49 is connected through the expansion joint 51 and the check valve 52 to a passageway 68 which communicates through the passageway 69 with the interior of the injection chamber 63. The injection ram 71 is fastened by a conventional coupling 72 to the plunger 73 of an injection cylinder of which the cylinder portion is indicated at 74. Said cylinder 74 is mounted on an injection unit plate 76 which is fixed by suitable rods of which one is shown at 77 to a position spaced above but fixed with respect to the base plate 61. The switch 78 is vertically adjustable on a rod 79 in a position to be engaged by the coupling 72 as same attains a predetermined distance above the injection block 62. Such switch 78 is connected through a conventional control box B to valves $V_B$ by which pressure fluid entering into the injection cylinder 71 is controlled.

The valve unit 56 and injection nozzle 88 are illustrated in FIG. 6. The discharge orifice 82 of the injection units 53 are connected by a passageway 83, partially shown in FIG. 6 and partially indicated by the dashed line connecting FIGS. 4 and 6, to the internal chamber 84 of said valve unit 56. When the valve plunger 86 is retracted said chamber then communicates to and through the injection nozzle 88 to whatever mold cavity the injection nozzle is then in communication. The valve rod 86 is operated by any convenient automatic means such as a pressure fluid cylinder 90 which is operated in proper sequence with the rest of the apparatus by any conventional sequential means desired.

Each of the valve units 56a, 56b and 56c (FIG. 3) are indentical to the valve unit 56 and thence need no further description.

Additional injection assemblies are supplied by the discharge orifice 37 of the extruder 15 and are indicated generally at 54a, 54b and 54c. These are all identical with the injection assembly 54 and hence need no further illustration or description. The unit 54a is supplied from the conduit 46 by a conduit 49a identical with the conduit 49. The units 54b and 54c are supplied from the conduit 41 by a conduit 46a to conduits 49b and 49c which conduits and connections including check valves are all identical to those above described in connection with conduits 46 and 49 above.

Likewise the discharge orifice 36 of the foam generating unit 10 will normally supply further, here four, additional injection assemblies through suitable conduits and check valves all of which preferably constitute a mirror image of the injection units 54, 54a, 54b and 54c together with the conduits and check valves above described in connection therewith and hence need no further discussion or description.

The mold may be associated with the injection units in any desired pattern. For example, as illustrated by the broken line M in FIG. 3, a mold may be associated with a single valve assembly 56 or as illustrated by the broken line $M_1$ a single mold may be supplied for two such valve units. A still further possibility is illustrated by the broken line $M_2$ which indicates that a single mold with either single or multiple cavities as desired may be supplied for all four valves of the single injection assembly, here the injection assembly 54c. Likewise a still larger mold may be supplied for two or more injection assemblies simultaneously, even to the extent conceivably of supplying a single cavity for all of the eight injection assemblies shown in FIG. 3.

Figure 7:
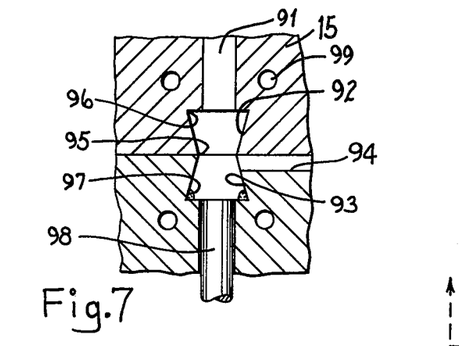
FIG. 7 is a central, sectional detail of the sprue opening in the upper and lower halves, showing same in central section and showing locking means for utilizing the plastic material to lock the mold halves together during cooling.

Referring to FIG. 7 there is shown the locking means by which a relatively large mold may be held closed without the use of external clamping pressure whereby the mold may be removed from the machine prior to such cooling of the molded part as would be required for opening of the mold.

In a high pressure injection molding operation, especially one involving a foam formed by bubbles of pressurized gas, the mold is normally held under a high clamp pressure until the part has cooled sufficiently to permit opening of the mold. With a large part, this can involve considerable time and lessen the effectiveness of multi-mold (as turret) machines.

Thus, in the present machine the lower side of the upper or fixed mold half 15 is provided at the lower end of the sprue opening 91 with a reversely flared portion 92 which then communicates through an opening of smaller diameter than the maximum diameter of the flared opening 92 to an undercut portion 93. This latter then communicates with the runner 94 leading to the mold cavity. Additional similar recesses corresponding to the opening 92 and undercut 93 may also be provided around the mold cavity and connected thereto by runners similar to runner 94. Sufficient thereof are provided in view of the opening pressure in a given mold to hold same closed upon chilling of the plastic in said recesses. Suitable cooling means, as water passages 99, are provided to effect rapid chilling of the plastic in said recesses well ahead of the cooling, or setting, of the plastic in the mold cavity.

The mold may then be removed from the machine either manually or by automatic means of any conventional type.

The plastic locked into the corners 96 and 97 of the opening above described will hold the mold tightly shut and effectively prevent same from springing open in response to the gas pressure therewithin. This makes possible the removal of the mold from the clamp of the machine prior to its cooling sufficiently to permit opening of the mold and hence makes more efficient the use of multi-mold machines. After the molded part has cooled the mold may then be opened. When the mold is opened, the locking plug will break at the narrow opening 95.

The lower portion thereof in the opening 92 may, if the reverse cut is not too great and the plastic is of slightly elastomeric type as an ABS material, be driven out as a cold slug by the next molding cycle or by mechanical means and handled in any conventional manner. The part in the undercut 97 can, if said undercut is not too great and the plastic is of slightly elastomeric type as an ABS material, be driven past the undercut and out by appropriate application of knock-out pins, as the knock-out pin 98. Alternatively, with larger reverse cuts, or undercuts, or with use of a more rigid plastic material the walls defining the said recesses may be made radially retractable, as by utilizing an iris type structure, a collect or other cam means in order to release the rigidified plastic therefrom. Any convenient means, automatic or manual, may here also be employed to remove the rigidified plastic from within the locking recesses and the passageways associated therewith. While in the present case the plastic supplied to said locking recesses is the same plastic as supplied to the mold and is introduced thereinto at the same time as the filling of the mold cavity, it will be evident that this is only illustrative and not limiting. Within the broader concept, the locking recesses may be supplied separately from the mold cavity and with a different plastic material.

OPERATION

Although the operation has already been somewhat indicated above, it will be reviewed in detail to insure a full understanding of both the process and apparatus aspects of the invention, again bearing in mind that the apparatus expression of the invention illustrates one but not necessarily the only manner of carrying out the process aspect thereof.

With plastic material and a gas inert thereto under pressure introduced into the foam generating device 10 as above described, a foam plastic is created and discharged from the conduits 36 and 37 in a manner already sufficiently above described. Looking for the present at only the right hand side (as seen in FIG. 3) of the apparatus, plastic material will flow through the conduit 41 to the T-head 43. As the conduit 41 heats it will expand at a rate different from that of the frame plate 4 and hence such expansion will be absorbed in the expansion joint 42 in a manner which will be readily understood without further explanation. The pressure block 44 is provided with convenient adjustment means, such as the manually adjustable screw 45, for limiting the movement (here rightward) of the T-block 43 and thereby maintaining the conduits 46 and 46a in proper alignment and insuring correct operation of the expansion joint 42. The expansion joint 47 operates in the same manner as expansion joint 42 and the pressure block 50 operates in the same manner as the pressure block 44, both in its own relationship to the T-block 48 and in its relationship to the expansion joint 47. Plastic material thus flows from the conduit 41 through the T-block 43, through both of the conduits 46 and 46a to the T-blocks 48 and 48a, thence through the conduits 49, 49a, 49b and 49c to pass the several check valves, of which only check valve 52 is illustrated, and into the chamber 63 of the several injection assemblies of which only injection assembly 54 is fully illustrated. With the valves 56 closed, the injection chamber 63 fills and the ram 71 is pushed upwardly until it strikes the actuator of the switch 78. When this occurs the control B is actuated to open the valve $V_R$ for supplying the pressure fluid to the cylinder 74. The magnitude of such pressure may if desired be only sufficient to oppose the incoming pressure from the line 49 but for simplicity of the control system it is preferred that said pressure is of injection magnitude. Since each of the valves 56 is closed at this point, the downward urging of the ram 71 drives the plastic material below said ram against the check valve 52 to close same and hold it closed against the pressure of incoming plastic material. Thus, further filling of the chamber 63 is prevented. However, assuming that the corresponding rams in the other injection assemblies 54a, 54b and 54c have not yet contacted the switches therein corresponding to the switch 78, the plastic material will continue to flow into each of these assemblies until they are all caused to actuate their respective switches and all are subjected to injection pressure in the manner above described in connection with the injection assembly 54. Thus, each injection chamber corresponding to the chamber 63 is filled with a predetermined amount of plastic material and termination of the filling of each thereof may be made solely by the appropriate mechanical setting of the several switches corresponding to the switch 78. Further, it will be recognized that the setting of each such switch is independent of the setting of other switches and the modifying or resetting of any one, or plurality, of said switches will not affect or alter the amount of plastic material going into the injection chambers associated with the other switches.

When all of the injection units are filled and subjected to injection pressure, at least all of those which are to be utilized in any given operation (it being recognized that in some instances certain ones of these assemblies may be blocked by appropriate manually operable valves -- not shown), a suitable signal will emanate from the master control panel P (which may be conventional) and each of the pressure cylinders associated with each of the valves 56 will be actuated to open said valves. With such valves so opened and with pressure already existing in the injection cylinders 74, (or increased simultaneously with the opening of the valves 56) said pressure will drive the several rams 71 downwardly and drive the foamed plastic within the cylinders 63 through the exit 82 therefrom and through the conduits above described to the injection nozzle 88 and into the several mold cavities.

Again it will be recognized that the operation of each injection cylinder is independent from the operation from each other injection cylinder so that there is no necessity at all for having therein equal amounts of plastic material. Thus, each thereof will merely discharge whatever plastic material it has in its respective injection chamber and a mold cavity, or portion thereof, associated with such nozzle will be appropriately filled.

It will be further recognized that throughout the entire path from the discharge of the plasticizing unit 10 through all of the distribution system, the injection assembly 54 and into the mold, a constant pressure is held on the plasticized material and same is thereby controlled against undesired expansion in response to the bubbles of pressurized gas therewithin.

It will be further recognized that in the present invention the distribution through the general system from the discharge of the plasticizing unit 10 to the injection chambers 63 is at a relatively low pressure and hence power losses manifested as pressure drop in the present systems (which force distribution under high pressures) are avoided. Further, the problems of conduit strength, the sealing therof, and other well known problems of high pressure plastic distribution are avoided. In this system the high pressure conduit exists only from the discharge of the injection cylinders 63 to the mold and each of these passageways is relatively short and free of points requiring difficult sealing. Hence this system is much less expensive to build and/or to maintain effectively than those in which the distribution is effected under high pressure by a single large injection ram.

It will be recognized that the machine herein described and illustrated is of extreme flexibility for the supplying of single or multiple molds and for the supplying of molds of a wide range of sizes. Further, if the machine is operated only at partial capacity, it is necessary only to operate whichever of the relatively small injection assemblies is required to fill such molds as are then in use. Still further, it is conceivable that it is possible for a user to install a machine of this type having only for example two injection assemblies 54 but with a capacity in the stationary platen 4 for a larger number such as eight thereof and then to add further such injection assemblies subsequently as his business justifies or requires. It will also be observed that although the apparatus of the invention was particularly designed for and is particularly adaptable to the molding of foam plastic, it is not confined thereto but may be utilized additionally for molding of conventional solid plastic materials, thus adding still further to its versatility.

While the foregoing apparatus has assumed the use of an extruder as the plasticizing means, it will be recognized that other known plasticizing devices may also be used. For example, the extrusion screw 18 could conceivably be replaced by a ram and torpedo combination whereby plastic material in granular form with pressurized gas contained therein could be supplied to the chamber 17 ahead of a plasticizing ram which could then drive the plastic material with entrained gas therein past a torpedo for plasticizing thereof. This however, while recognized as a possibility is believed, at least at present, to be less desirable in view of the greater difficulties of plasticizing by use solely of a torpedo.

While a particular embodiment of the apparatus aspects of the invention has been chosen to illustrate both the method and apparatus aspects thereof, it will be recognized that the method of the invention may be practiced by a wide variety of other types of apparatus and the apparatus of the invention may be manifested in a variety of specific embodiments. Accordingly, the specific disclosures herein will be recognized as illustrative only and not limiting.

The embodiments of the invention in which an exclusive property or privilege is claimed are defined as follows:

1. Apparatus for generating and molding a foam-plastic material comprising in combination:
    means defining a plasticizing chamber and a plasticizing screw contained therein for plasticizing granular plastic material introduced thereinto;
    means defining a pressure-tight supply chamber having a discharge opening in pressure-tight communication with said plasticizing chamber and means for introducing into said supply chamber a gaseous material under pressure;
    means for introducing into said supply chamber a granular plastic material;
    a thrust chamber defined by a portion of said plasticizing chamber and a portion of said plasticizing screw associated therewith, both of said chamber and screw portions projecting beyond the discharge opening of said supply chamber in a direction opposite to that of the movement of the plastic material during a plasticizing operation, and conduit means connecting said thrust chamber to the interior of said supply chamber for equalizing pressure therebetween;
    whereby melting of the plastic granules while permeated by gas granules from said upper hopper into said supply chamber.

2. Apparatus for generating a foam-plastic material comprising in combination:
    means defining a plasticizing chamber;
    means defining a pressure-tight supply chamber;
    means for introducing into said supply chamber a granular plastic material;
    high pressure gas supply means connected to said supply chamber for introducing into the spaces between plastic granules therein and prior to any softening of said granules a gas under a relatively high first pressure and which is the sole foam forming gas;
    pressure tight means defining a discharge opening from said supply chamber for supplying said granular plastic material permeated by said high pressure gas into said plasticizing chamber;
    plasticizing means contained in and cooperable with said plasticizing chamber for plasticizing said granular plastic material with said high pressure gas still intermixed therein;
    means positively closing the end of said plasticizing chamber at the end thereof opposite the direction of moving of the plastic material during a plasticizing operation for positively under pressure will arrange same around bubbles or said gas and form a plastic foam.

3. The device of claim 2 in which said means for introducing comprises an upper hopper atop said supply chamber, an opening communicating therebetween, a valve interposed in said opening for closing same and means fixed with respect to said upper hopper and actuable for opening said valve to drop a measured amount of plastic preventing the escape of high pressure gas from said end of said plasticizing chamber; and
    means driving said plasticizing means from the opposite end of said plasticizing chamber;
    whereby melting of the plastic granules while permeated by said gas under pressure will arrange the plastic around bubbles of said gas and form a plastic foam.

4. The device of claim 2 wherein said plasticizing means is a screw.

5. The device of claim 2 wherein said means for positively preventing the escape of gas from said first named end of said plasticizing chamber includes means introducing thereinto a high pressure gas.

6. Apparatus for generating a foam-plastic material comprising in combination:
    means defining a plasticizing chamber and plasticizing device contained therein for plasticizing granular plastic material introduced thereinto;
    means defining a pressure-tight supply chamber having a discharge opening in pressure-tight communication with said plasticizing chamber;
    means for introducing into said supply chamber a granular plastic material;
    high pressure gas supply means connected to said supply chamber for permeating the granular mass therein with a high pressure gas prior to admission to said plasticizing chamber;
    a foamed plasticized material outlet in said plasticizing chamber spaced downstream along said plasticizing device from said discharge opening;
    backing means defined in said plasticizing chamber and by said plasticizing device upstream from said discharge opening and also connected to said high pressure gas supply means for (a) urging said plasticizing device in the downstream direction and (b) preventing escape upstream beyond said plasticizing device of gas from said discharge opening;
    whereby melting of the plastic granules while permeated by said high pressure gas will arrange same around bubbles of said gas and form a plastic foam.

7. The device of claim 6 in which said backing means comprises a thrust chamber defined between the upstream ends of the plasticizing chamber and plasticizing means, and a conduit connected therefrom to said supply chamber and high pressure gas supply.

8. The device of claim 7 in which said plasticizing device comprises a screw and including an axial thrust bearing adjacent the downstream end of the screw, rotational drive means connected to the downstream screw end outboard of the thrust bearing, plastic foam outlets adjacent and upstream of said thrust bearing, means defining flights on said screw between said foam outlets and discharge opening for applying a back pressure, less than the gas pressure, to the bubble carrying material in contact therewith and for discharging and controlling the outlet pressure of the resultant plastic foam.

* * * * *

UNITED STATES PATENT OFFICE
CERTIFICATE OF CORRECTION

Patent No. 3,879,155          Dated April 22, 1975

Inventor(s) James W. Hendry

It is certified that error appears in the above-identified patent and that said Letters Patent are hereby corrected as shown below:

Col. 11, lines 57 and 58; change "gas granules from said upper hopper into said supply chamber." to ---gas under pressure will arrange same around bubbles of said gas and form a plastic foam.---.

Col. 12, lines 15-17; change "positively under pressure will arrange same around bubbles or said gas and form a plastic foam." to ---positively preventing the escape of high pressure gas from said end of said plasticizing chamber; and means driving said plasticizing means from the opposite end of said plasticizing chamber;

whereby melting of the plastic granules while permeated by said gas under pressure will arrange the plastic around bubbles of said gas and form a plastic foam.---.

UNITED STATES PATENT OFFICE
CERTIFICATE OF CORRECTION

Patent No. 3 879 155          Dated April 22, 1975

Inventor(s) James W. Hendry

It is certified that error appears in the above-identified patent and that said Letters Patent are hereby corrected as shown below:

Col. 12, lines 24-31; delete entirely and replace with:

---amount of granules from said upper hopper into said supply chamber.---.

Signed and Sealed this second Day of September 1975

[SEAL]

Attest:

RUTH C. MASON
*Attesting Officer*

C. MARSHALL DANN
*Commissioner of Patents and Trademarks*